United States Patent
Sandstrom et al.

(10) Patent No.: US 9,487,050 B2
(45) Date of Patent: Nov. 8, 2016

(54) TIRE WITH TREAD HAVING BASE LAYER COMPRISED OF DIVERSE ZONED RUBBER COMPOSITIONS

(75) Inventors: Paul Harry Sandstrom, Cuyahoga Falls, OH (US); Arthur Allen Goldstein, Mayfield Village, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1216 days.

(21) Appl. No.: 13/103,242

(22) Filed: May 9, 2011

(65) Prior Publication Data

US 2012/0285590 A1 Nov. 15, 2012

(51) Int. Cl.
*B60C 11/00* (2006.01)
*B60C 1/00* (2006.01)

(52) U.S. Cl.
CPC .......... *B60C 1/0016* (2013.04); *B60C 11/005* (2013.01); *B60C 11/0075* (2013.04)

(58) Field of Classification Search
CPC ................................................. B60C 11/0075
USPC ....................................................... 152/209.5
See application file for complete search history.

(56) References Cited

U.S. PATENT DOCUMENTS

| | | | | |
|---|---|---|---|---|
| 3,916,968 A * | 11/1975 | Masson | | 152/532 |
| 4,274,462 A * | 6/1981 | Ogawa | | B60C 1/0016 152/209.4 |
| 4,838,330 A * | 6/1989 | Takayama | | 152/209.5 |
| 5,046,542 A * | 9/1991 | Ohta et al. | | 152/209.5 |
| 6,036,800 A * | 3/2000 | Corvasce | | B60C 1/0016 152/209.4 |
| 2002/0036041 A1* | 3/2002 | Suzuki | | 152/209.5 |
| 2002/0079033 A1* | 6/2002 | Suzuki | | 152/209.16 |
| 2003/0145929 A1* | 8/2003 | Kanenari | | B60C 9/1821 152/209.4 |
| 2004/0050469 A1* | 3/2004 | Sandstrom | | B60C 11/005 152/209.5 |
| 2004/0112490 A1* | 6/2004 | Sandstrom | | 152/209.5 |
| 2007/0221303 A1* | 9/2007 | Sandstrom et al. | | 152/209.5 |
| 2010/0236695 A1* | 9/2010 | Lamontia | | B60C 1/0016 156/123 |

FOREIGN PATENT DOCUMENTS

| | | | | |
|---|---|---|---|---|
| DE | 10360432 | | 7/2004 | ............ B60C 11/12 |
| DE | 102009043991 | | 3/2011 | ............ B60C 11/00 |
| DE | 102009043991 | A1 * | 3/2011 | |
| EP | 1016555 | | 7/2000 | ............ B60C 11/00 |
| EP | 1454765 | A1 * | 9/2004 | |
| EP | 1837206 | | 9/2007 | ............ B60C 11/00 |
| WO | 2009069586 | | 6/2009 | ............ B60C 11/00 |

OTHER PUBLICATIONS machine translation for German 102009043991 (no date).*
European Search Report received by Applicants Aug. 27, 2012.

* cited by examiner

*Primary Examiner* — Steven D Maki
(74) *Attorney, Agent, or Firm* — Henry C. Young, Jr.

(57) ABSTRACT

The invention relates to a tire having a rubber tread comprised of cap/base construction where the tread outer cap rubber layer contains the running surface of the tread and the tread base rubber layer underlies the tread cap layer wherein the base layer provides a transition zone between the tread cap layer and the remainder of the tire carcass and is not intended to be ground-contacting. For this invention, the tread base rubber layer is comprised of three distinct zones, namely a circumferential annular central rubber zone positioned between two lateral annular rubber zones. In one aspect, the rubber tread cap layer and zoned rubber tread base layer are co-extruded together to form an integral tread rubber composite.

3 Claims, 1 Drawing Sheet

TIRE WITH TREAD HAVING BASE LAYER COMPRISED OF DIVERSE ZONED RUBBER COMPOSITIONS

FIELD OF THE INVENTION

The invention relates to a tire having a rubber tread comprised of cap/base construction configured with an outer tread cap rubber layer with a tread running surface and an underlying tread base rubber layer of a rubber composition having a gradation of physical properties. In one embodiment, the tread base rubber layer is comprised of a plurality of distinct circumferential zones.

BACKGROUND FOR THE INVENTION

A tire tread base rubber layer, which underlies the outer tread cap rubber layer is typically comprised of a unitary rubber composition. The rubber composition for the tread base rubber layer is often optimized to assist in promoting various overall tread properties such as, for example, reduced tire rolling resistance, tire handling such as cornering, reduced internally generated heat built up and to provide a physical transition between the outer tread cap rubber layer and the rest of the tire, particularly the supporting tire carcass. In practice, the tread base rubber layer may lie on a rubber reinforced cord belt beneath the tread or cord reinforced overlay or on a fabric reinforced rubber ply of the tire carcass.

Using the standard approach of a unitary base compound one could improve handling of a tire by using a stiffer base compound, which would also provide inferior rolling resistance. In contrast, one could improve rolling resistance by using a softer base which is less hysteretic and also this approach would provide worse handling performance. The desire to achieve improved handling and rolling resistance in a tire requires an alternative approach in tread base construction.

For this invention a departure from such past practice is contemplated in a sense of providing such tread base rubber layer with different zones of compound properties that would allow the opportunity to improve both rolling resistance and handling performance. This is accomplished by producing different zones of rubber composition properties in the tread base layer. The lateral tread base rubber zones would consist of higher stiffness rubber compositions than the central zone of the tread base layer. Handling performance for the tread and associated tire would be enhanced, since the lateral portion of the tread outer tread cap rubber layer immediately above and overlaying a lateral zone of the zoned tread base rubber layer would be supported by the lateral tread base zone which is stiffer than the central zone of the tread base rubber layer.

However at the same time, the tread outer running surface, whether in a cornering maneuver or simply rolling in a straight line, is required to go through a deformation process as the tread running surface comes in contact with the road surface and deforms the tread running surface to present a foot print shape. The softer center portion of the tread base can beneficially promote easier, lower energy demanding, and more consistent foot print shape deformation of the tire tread by providing a softer hinge point or center point of the tread for the tread bending taking place to assume the tire running surface's foot print shape. This associated reduced energy loss of assuming the foot print shape for the rolling tread running surface may also beneficially promote reduced rolling resistance for the tire tread and ultimately the tire. This approach is believed to be quite novel in a sense that handling of the tire could be substantially maintained without significant increase in its rolling resistance and with an opportunity of lowering rolling resistance where, in some cases, both rolling resistance and handling could be both beneficially improved at the same time. It is envisioned that such results relating to handling and rolling resistance could not be achieved while using a unitary, non-zoned, outer tread cap rubber composition, or compound. The choice of tread cap rubber compounds is not a part of this invention, but one could envision the use of a wide range of tread cap compounds with different properties and in some cases the use of zoned tread cap rubber layer.

Each of the tread base rubber zones are contemplated as being relatively wide, and therefore individually comprise a significant portion of the tread base layer rather than a very thin rubber segment of a few millimeters in width. For the proposes of this invention, the central tread base rubber zone may constitute, a considerable width of the tread base layer such as, for example, from about 55 to about 80 percent of the width of the tread base rubber layer, or alternatively, a more narrow width in a range of, for example, of from about 10 to about 30 percent of the axial width of the tread base rubber layer and two adjoining individual lateral tread base rubber zones may collectively and correspondingly constitute the remainder of the axial width of the tread base rubber layer.

In the description of this invention, the terms "rubber" and "elastomer" where herein, are used interchangeably, unless otherwise provided. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise provided. The terms "cure" and "vulcanize" may be used interchangeably unless otherwise provided.

In the description of this invention, the glass transition temperature (Tg) may be determined according to differential scanning calorimeter (DSC) analysis at a heating rate of 10° C. per minute.

SUMMARY AND PRACTICE OF THE INVENTION

In accordance with this invention, a tire is provided having a circumferential rubber tread composite configured with a cap/base layered construction comprised of an outer tread cap rubber layer containing the running surface of the tread and an internal underlying zoned tread base rubber layer, wherein the underlying zoned tread base rubber layer is comprised of a central tread base rubber zone and two lateral tread base rubber zones individually adjoining and positioned on each side of said central tread base rubber zone;

wherein said central tread base rubber zone comprises from about 10 to about 80 percent, alternately from about 55 to about 80 percent, from about 10 to about 55 percent, or from about 10 to about 30 percent, of the width (e.g. axial width) of the tread base rubber layer and the lateral tread base rubber zones occupy the remainder of the width of the tread base rubber layer;

wherein the rubber composition of said lateral tread base zones is significantly stiffer than the rubber composition of said central tread base zone.

In one embodiment, the rubber composition of said lateral tread base zones is significantly stiffer than the rubber composition of said central tread base zone in a sense of having a significantly greater modulus G' physical property under conditions (e.g. physical test conditions) of 15 percent shear strain at 25° C. and frequency of 10 Hz.

In one embodiment, tan delta values of the rubber compositions of said lateral tread base zones and said central tread base zone are relatively low and comparable to each other to, for example, promote improved tire rolling resistance with improved vehicular fuel economy.

For example, it is desired that the rubber composition of said lateral tread base rubber zones has a modulus G' value, at 15 percent shear strain, 25° C. and 10 Hertz, in a range of from about 1.5 to about 20 MPa, alternately from about 2.5 to about 10 MPa and the rubber composition of said central tread base rubber zone has modulus G' value, at 15 percent shear strain, 25° C. and 10 Hertz, in a range of from about 0.25 to about 2 MPa, alternately from about 0.5 to about 1.5 MPa, wherein the said G' modulus of the rubber composition of said central tread base zone is at least 1 MPa lower than the said G' modulus of said rubber composition of said lateral tread base zones.

It is further desired that the relatively low tan delta values for the rubber composition of said lateral base zones are in the range of about 0.05 to about 0.2, alternately from about 0.05 to about 0.1, and the tan delta values for the rubber composition of said center (central) zone are in the range of about 0.05 to about 0.15, alternately from about 0.05 to about 0.1, under conditions of 15 percent shear strain, 25° C. and 10 Hz.

For convenience, the aforesaid respective modulus G' values and tan delta values for the rubber composition for the central tread base rubber zone and lateral tread base rubber zones are illustrated in the following Table A.

TABLE A

| | Central Tread Base Zone | Lateral Tread Base Zones |
|---|---|---|
| Modulus G' (MPa) | 0.25 to 2 | 1.5 to 20 |
| Alternately | 0.5 to 1.5 | 2.5 to 10 |
| Tan delta | 0.05 to 0.15 | 0.05 to 0.2 |
| Alternately | 0.05 to 0.1 | 0.05 to 0.1 |

The said modulus G' value for the rubber composition for the central tread base zone is to be at least 1 MPa less (lower) than the said modulus G' value for the rubber composition for the lateral tread base zones.

In one embodiment, for the tire of this invention, the significantly higher stiffness of the rubber composition for the lateral tread base rubber zones, in the sense of its significantly higher modulus G' value, combined with the significantly lower stiffness of the central tread base rubber zone in the sense of its significantly lower modulus G' value, provides significant support for outer tread cap rubber layer, which contains the tread running surface, particularly the lateral portions of the outer tread cap rubber layer, to thereby promote more effective ground contact for the tire tread, particularly its lateral tread portions, during vehicular and tire handling maneuvers.

Elastomers for the rubber compositions of the central and lateral tread base rubber zones would be conjugated diene-based rubbers comprised of, for example, c is 1,4-polyisoprene (natural and synthetic), c is 1,4-polybutadiene and styrene/butadiene rubber together with rubber reinforcing filler as rubber reinforcing carbon black and optionally amorphous precipitated silica (precipitated silica), individually and in combination, with their respective selection and amounts adjusted according to the desired G' and tan delta values for the lateral and central zone base rubber compositions. Typical curatives, processing oils, and rubber compounding additives would be selected for the compounds to achieve their desired G' and tan delta and other cured properties.

In practice, it is usually desired for said rubber compositions which contain said precipitated silica, to provide a coupling agent having a moiety reactive with hydroxyl groups (e.g. silanol groups) contained on the surface of said silica and another moiety interactive with said diene-based polymers.

In one embodiment of the invention, the rubber compositions of at least one of said lateral tread base zones, namely one lateral tread base zone or both lateral tread base zones, contains, to the exclusion of said central tread base zone, a small amount of from about 1 to about 10, alternately from about 2 to about 5, phr, of at least one rubber stiffness promoting ingredient comprised of at least one of short fibers, syndiotactic polybutadiene and polyethylene particularly ultrahigh molecular weight polyethylene (UHMWPE), to add stiffness to the rubber composition, preferably without significantly adding to its tan delta value. Representative of such short fibers are at least one of carbon, aramid, nylon and polyester fibers.

In one embodiment of the invention, the said tread cap rubber layer and said underlying zoned tread rubber layer are co-extruded together to form an integral and unified tread composite.

In practice, said two individual lateral tread base zones may be of equal widths, or at least of substantially equal widths, or may be asymmetrical in a sense that they are of unequal widths where one lateral zone is less than 100 percent of the width of the other lateral zone, for example a width of from about 40 to about 90 percent of the width of the other lateral zone, although it is contemplated that each of the two individual lateral tread zone rubber layers occupies at least 10 percent of the width of the tread base rubber layer. A significant aspect of the invention is the transversally (axially) wide individual circumferential tread base rubber zones underlying said outer tread cap rubber layer for which said central tread base layer comprises in a range of from about 10 to about 80 percent of the axial width of the tread base rubber layer and the two lateral tread base rubber layers collectively comprise at least about 20 percent of the axial width of the tread base rubber layer.

As indicated, a significant aspect of the invention is the purposeful and intended imbalance of said modulus G' values and tan delta values between said lateral tread base zone rubber compositions and said central tread base zone rubber composition is provided wherein the rubber composition of said central tread base zone has a significantly lower modulus G' and similar tan delta value compared to such physical values of the rubber composition of said lateral tread base zones.

Accordingly, the tread base rubber layer is provided with said three distinct zones, namely two lateral zones having said higher modulus G' values and a central zone having a significantly lower modulus G' value to provide higher stiffness in the tread base lateral (outer) zones to promote tire handling such as for example cornering and tread and vehicular lateral stability, and to provide lower stiffness in the central zone to promote improved (lower) rolling resistance, and thereby beneficially increased vehicular fuel economy, for the tire.

It is to be appreciated that one having skill in rubber compounding for tire treads can readily provide the tread base rubber zones with the indicated rubber composition properties with routine evaluation and without an undue extent of experimentation.

Therefore, the invention is directed to a structural configuration of a tire tread combined with distinct, zoned, individual rubber compositions for the underlying base rubber layer of the tread.

In practice, the modulus property G' is a viscoelastic property of a rubber composition which may be determined by a Rheometrics Dynamic Spectrometer instrument of the Rheometrics Company as RDS 7700 Series II (referred to herein as an "RDS" instrument). The RDS instrument uses dynamic mechanical analysis to evaluate rubber compositions. A sinusoidally oscillating shear deformation is used as an operating mode. A sample of the respective rubber composition is subjected to a precisely controlled deformation (15 percent strain, 10 Hertz frequency and room temperature of about 25° C.) and the stress response of the sample is observed by the instrument. The observed sample response can be separated, by the instrument, into viscous (G") and elastic (G') components. As indicated, for the purposes of this specification, the aforesaid testing conditions for the instrument were 15 percent strain, 10 Hertz and room temperature of about 25° C. to determine the G' elastic low shear property in terms of MPa.

One having skill in the pertinent art would understand how to provide rubber compositions of various low shear properties (at 15 percent strain at 10 Hertz at room temperature of about 25° C.) pursuant to the requirements of the zoned tread base rubber composition for this invention composed of the aforesaid elastomers and reinforcing fillers with routine evaluation without undue experimentation.

For the purposes of this invention, the tan delta property may also be determined by the RDS instrument pursuant to the requirements of the tread cap zone rubber composition for this invention composed of the aforesaid elastomers and reinforcing fillers with routine evaluation and without undue experimentation.

In further accordance with this invention, a method is provided of promoting lateral stability for a tire tread configured with a cap/base construction comprised of an outer cap rubber layer having a running surface and an underlying internal tread base rubber layer wherein said method of promoting lateral stability further promotes more effective ground contact for said tire, wherein said method comprises:

(A) providing said underlying internal tread base rubber layer with a configuration comprised of a central tread base zone and two lateral tread base rubber zones adjoining and individually positioned on each side of said central tread base rubber zone;

wherein said central tread base rubber zone comprises from about 10 to about 80 percent of the width of the tread base rubber layer and the lateral tread base rubber zones occupy the remainder of the width of the tread base rubber layer; and (B) providing said lateral tread base rubber zones with a rubber composition significantly stiffer than the rubber composition of said central tread base zone.

In additional accordance with this invention, such method promotes lateral stability of the ground contacting footprint of the tire, namely what is conventionally referred to as the foot print of the tire on the ground over which the tire rolls, and thereby promotes more effective ground contact for said tire.

In further accordance with this invention, for such method:

(A) said lateral tread base rubber zones are provided with a rubber composition having a modulus G' value, at 15 percent shear strain, 25° C. and 10 Hertz, in a range of from about 1.5 to about 20 MPa, and (B) said central base rubber zone is provided with a rubber composition having a modulus G' value, at 15 percent shear strain, 25° C. and 10 Hertz, in a range of from about 0.25 to about 1.5 MPa and at least 1 MPa lower than said G' modulus of said rubber composition of said lateral tread base zones.

In additional accordance with this invention, for said method:

(A) said lateral tread base rubber zones are provided with a rubber composition having a tan delta value in a range of from about 0.05 to about 0.2 under conditions of 15 percent shear strain, 25° C. and 10 Hertz, and (B) said central tread base rubber zone is provided with a rubber composition having tan delta value in a range of from about 0.05 to about 0.15 under conditions of 15 percent shear strain, 25° C. and 10 Hertz.

In further accordance with this invention, for said method, said central tread base zone constitutes from about 10 to about 80 percent of the width (radial width) of the tread base rubber layer.

BRIEF DESCRIPTION OF DRAWINGS

For a further understanding of this invention, FIGS. 1, 2 and 3 (FIGS. 1, 2 and 3) are provided as a partial cross-sectional views of a portion of a tire having a tread of a cap/base construction having an outer tread cap rubber layer and an underlying zoned tread base rubber layer.

IN THE DRAWINGS

Figure 1:
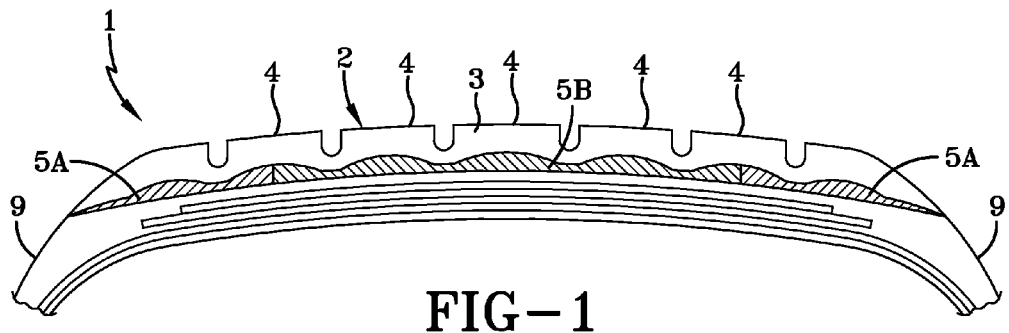

FIG. 1 depicts a tire (1) having a tread (2) comprised of a tread cap layer (3) with running surfaces (4) and underlying zoned tread base layer (5A and 5B), and sidewalls (9).

Said zoned tread base layer (5A and 5B) is comprised of three annular, circumferential zones of rubber compositions comprised of a central zone (5B) positioned between two individual lateral zones (5A).

In particular, said tread base rubber layer (5) is not normally intended to be ground contacting.

For FIG. 1, the central tread base zone (5B) is depicted as constituting about 60 percent of the width (e.g. axial width) of the tread base rubber layer (5) and the two lateral base rubber layers (5A) individually constituting about 20 percent, for a total of 40 percent, of the width of the base rubber layer (5).

Figure 2:
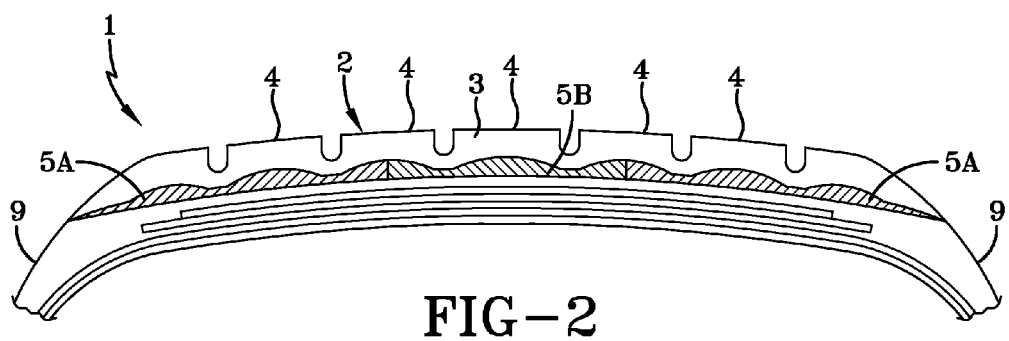

FIG. 2 depicts the tire of FIG. 1 where the central tread base zone (5B) is more narrow and constitutes about 30 percent of the width of the tread base rubber layer (5). This is for a tire where it is desired that the stiffer lateral zones of the tread base rubber layer provides a greater effect on the tread handling.

Figure 3:
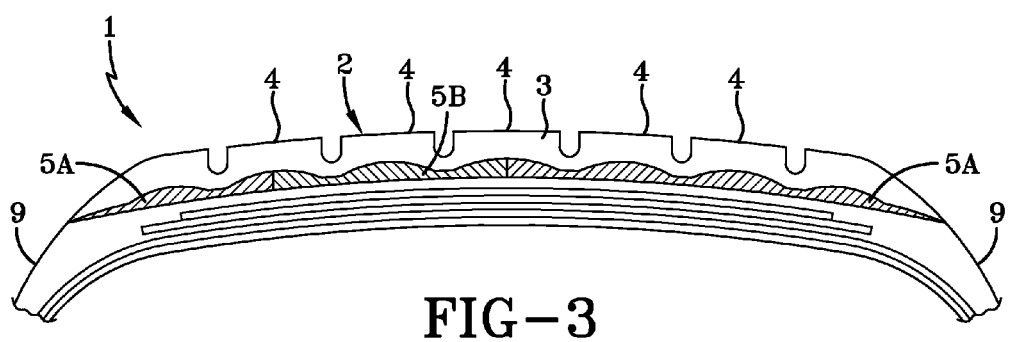

FIG. 3 depicts the tire of FIG. 1 where the one of said lateral tread base zones (5A) more narrow than the other lateral tread base zone (also represented as 5A in FIG. 3), namely about 50 percent of its width, to thereby off-set the central tread base zone (5B) constituting about 30 percent of the width of the tread base layer and to thereby create an asymmetrical tread base. This is for a tire where it is desired that the wider relative stiff lateral tread zone on one side of the tread base rubber layer provides a greater effect on the tread performance on one side of the tire.

In practice, the tread base zone layers may be comprised of the same or different elastomers, so long as, the requirements of the stiffness and tan delta properties for the respective tread base zones are met, in combination with the reinforcing fillers such as carbon black and precipitated silica.

In practice, the outer tread cap rubber layer is comprised of at least one diene-based elastomer such as, for example, at least one of cis 1,4-polyisoprene, c is 1,4-polybutadiene rubber and styrene/butadiene rubber.

In practice, the coupling agent for precipitated silica in the respective zones of the tread base rubber layer may be, for example, an alkoxysilyl polysulfide such as for example, a bis(3-trialkoxysilylalkyl)polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or an average of from 3.5 to 4, connecting sulfur atoms in its polysulfidic bridge, preferably an average of from 2 to 2.6 connecting sulfur atoms to the exclusion of such polysulfides having greater than 2.6 connecting sulfur atoms.

Representative of such coupling agents are, for example, bis(3-triethoxysilylpropyl)polysulfide having an average of from 2 to 2.6 or an average of from 3.5 to 4, connecting sulfur atoms in its polysulfidic bridge, preferably an average of from 2 to 2.6 connecting sulfur atoms to the exclusion of a bis(3-teiethoxysilanepropyl)polysulfide containing an average of greater than 2.6 connecting sulfur atoms in its polysulfidic bridge.

Such coupling agent may, for example, be added directly to the elastomer mixture or may be added as a composite of precipitated silica and such coupling agent formed by treating a precipitated silica therewith or by treating a colloidal silica therewith and precipitating the resulting composite.

In practice, the synthetic amorphous silica may be selected from aggregates of precipitated silica, which is intended to include precipitated aluminosilicates as a co-precipitated silica and aluminum.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 $cm^3/100$ g, and more usually about 100 to about 300 $cm^3/100$ g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165 MP and Zeosil 165GR, silicas from J. M. Huber Corporation as, for example, Zeopol 8745 and Zeopol 8715, silicas from Degussa AG with, for example, designations VN2, VN3 and Ultrasil 7005 as well as other grades of silica, particularly precipitated silicas, which can be used for elastomer reinforcement.

Representative examples of other silica couplers may be organomercaptosilanes such as, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In practice, the rubber compositions may be prepared in a sequential series of at least two separate and individual preparatory internal rubber mixing steps, or stages, in which the diene-based elastomer is first mixed with the prescribed carbon black and/or silica in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature of less than 40° C. and, for example, in a range of about 40° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts so long as the aforesaid modulus G' and tan delta values are obtained.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The following Example is provided to further illustrate the invention.

EXAMPLE

To accomplish an evaluation of an effect of providing a zoned tread base rubber layer for a tire of cap/base construction compared to a non-zoned, unitary compositional tread base rubber layer, a computer based modeling comparison was undertaken with software designed to generate tire configurations combined with rubber components of varying physical properties for tire performance predictability.

For the computer based modeling, a model of a tire with a cap/base configuration was generated with a unitary compositional individual tread base rubber layer and compared to such cap/base configuration with a zoned tread base rubber layer being divided into separate zones, namely a central tread rubber zone occupying about 60 percent of the width of the overall tread base layer, (similar to FIG. 1) and two lateral tread base rubber zones with each individually positioned next to and on opposite sides of the central tread rubber zone (also similar to FIG. 1).

The computer generated outer tread base lateral zones were provided with a higher modulus G' (stiffness) value and similar tan delta values compared to the central tread zone layer.

The same computer generated model was applied to generate a single, unitary, tread base rubber underlying and extending the full length of the outer tread cap rubber layer without being zoned. The modulus G' (stiffness) and Tan delta properties used for rubber compositions for each of the rubber layers and zones are shown in the following Table 1 as being obtained at 25° C., 10 Hz and 15% shear strain conditions.

TABLE 1

|  | G' (MPa) | Tan Delta |
| --- | --- | --- |
| Single tread base rubber composition | 1 | 0.18 |
| Zoned tread base layer rubber compositions |  |  |
| Central tread base zone | 0.70 | 0.08 |
| Lateral tread base zone | 2.8 | 0.07 |

It is to be appreciated that the zoned tread base layer configuration was found to enable providing the central tread base zone rubber composition with a much softer and substantially lower modulus G' value of 0.7 than the modulus G' value of 1.0 for the comparative single, unitized, tread base rubber composition because of providing the significantly beneficial stiffer and higher modulus G' of 2.8 for the lateral tread zones of the zoned tread base layer.

Further, it is envisioned that by manipulating the aforesaid stiffness, or modulus G' values, of the aforesaid tread base rubber compositions, use of the significantly lower tan delta values of 0.08 and 0.07 were beneficially enabled for the tread base rubber zones.

In particular, it can be seen that the Tan delta values used for the central and lateral tread base rubber zones are substantially the same, namely 0.08 and 0.07, respectively although substantially lower than the Tan delta value of 0.18 for the single tread base rubber composition.

Prospectively, it can be seen from Table 1 that the modulus G' value for the rubber composition for the two lateral tread base zones of 2.8 MPa was as much as 2.1 MPa greater (thereby significantly greater) than the modulus G' value of 0.70 used for the rubber composition of the central tread base zone. The modulus G' of the rubber composition of the single, unitary tread base rubber layer of 1 MPa was about midway between the modulus G' values of the central and lateral tread rubber compositions of the zoned tread base rubber layer.

A significant aspect of the computer model evaluation is the predicted improvement (reduction) of about 18 percent in rolling resistance for the tire having the zoned tread rubber base layer compared to the tire having the single, unitary, tread rubber base layer which is attributed herein to the aforesaid significantly lower stiffness (lower modulus G' value) of the rubber composition of central tread base rubber layer enabled by (combined with, or used in combination with) the inclusion of the significantly greater stiffness of the rubber composition of the lateral tread base rubber layer.

Further, the tire handling characteristic (e.g. tire tread lateral stability) for the computer modeled tire having the zoned tread rubber base layer is predicted to be significantly improved as compared to the tire having the single, unitary tread base rubber layer as a result of the significantly higher stiffness (higher modulus G' value) of the rubber composition for the lateral tread base rubber zones, as compared to the significantly lower modulus G' value used for central tread base rubber layer zone, which would also provide significant support for outer tread cap rubber layer, particularly the lateral portions of the outer tread cap rubber layer, which contains the tread running surface and thereby promote more effective lateral support and ground contact for the tire tread during vehicular and tire handling maneuvers.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a circumferential rubber tread composite configured with a cap/base layered construction comprised of an outer tread cap rubber layer containing the running surface of the tread and an internal underlying zoned tread base rubber layer, wherein the underlying zoned tread base rubber layer is comprised of a circumferential central tread base rubber zone and two circumferential lateral tread base rubber zones individually adjoining and positioned on each side of said central tread base rubber zone;

wherein said central tread base rubber zone comprises from about 55 to about 80 percent of the width of the tread base rubber layer and the lateral tread base rubber zones are of substantially equal widths and occupy the remainder of the width of the tread base rubber layer;

wherein the rubber composition of said lateral tread base zones are significantly stiffer than the rubber composition of said central tread base zone in a sense of:

(A) the rubber composition of said lateral tread base rubber zones have a modulus G' value, at 15 percent shear strain, 25° C. and 10 Hertz, in a range of from about 2.5 to about 10 MPa, and the rubber composition of said central tread base rubber zone has modulus G' value, at 15 percent shear strain, 25° C. and 10 Hertz, in a range of from about 0.5 to about 1.5 MPa, and (B) the G' modulus value of the rubber composition of said central tread base zone is at least 1 MPa lower than the G' modulus of said rubber composition of said lateral tread base zones, and wherein the rubber compositions of the central and lateral tread base zones are comprised of cis 1,4-polyisoprene and at least one of cis 1,4-polybutadiene and styrene/butadiene conjugated diene rubbers together with reinforcing filler comprised of rubber reinforcing carbon black and wherein reinforcing filler for at least one of the central and lateral tread base rubber zones further contains precipitated silica and coupling agent for the precipitated silica having a moiety reactive with hydroxyl groups contained on the surface of said precipitated silica and another moiety interactive with said conjugated diene-based rubber(s);

wherein the rubber composition of at least one of said lateral tread base zones contains, to the exclusion of said central tread base zone, from about 1 to about 10 phr of rubber stiffness promoting ingredient comprised of:

(C) short fibers consisting of at least one of carbon, aramid, nylon and polyester fibers, or (D) a combination of syndiotactic polybutadiene and short fibers wherein said short fibers consist of at least one of carbon, aramid, nylon and polyester fibers.

2. The tire of claim 1 wherein at least one of said lateral tread base zones contains, to the exclusion of said central tread base zone, from about 1 to about 10 phr of rubber stiffness promoting ingredient comprised of short fibers wherein said short fibers consist of at least one of carbon, aramid, nylon and polyester fibers.

3. The tire of claim 1 wherein at least one of said lateral tread base zones contains, to the exclusion of said central tread base zone, from about 1 to about 10 phr of rubber stiffness promoting ingredients comprised of a combination of syndiotactic polybutadiene and short fibers, wherein said short fibers consist of at least one of carbon, aramid, nylon and polyester fibers.

* * * * *